May 24, 1966 H. R. BURMEISTER 3,252,402

FREE BREATHING STORAGE STRUCTURE FOR STERILIZED GRAIN

Filed May 23, 1961

INVENTOR.
Harland R. Burmeister
BY
Andrus & Starke
Attorneys

3,252,402
FREE BREATHING STORAGE STRUCTURE FOR STERILIZED GRAIN

Harland R. Burmeister, Ames, Iowa, assignor to A. O. Smith Corporation, Milwaukee, Wis., a corporation of New York
Filed May 23, 1961, Ser. No. 112,115
5 Claims. (Cl. 99—235)

This invention relates to a free breathing storage structure for storing sterilized crops and more particularly to a filtering device which will permit the otherwise air tight structure to breathe freely while at the same time preventing the entrance of micro organisms into the structure.

Recent increases in crop surpluses have magnified the need for storage structures in which long term storage can be accomplished. Storage structures presently in use are not capable of storing crops for long periods of time. It is well known that crops stored for long periods of time are subjected to the severely deleterious effects of bacterial fermentation, mold growth, and insect infestation. The occurrence of any one of the above will cause the stored crop to be unfit for human consumption and reduce its value as an animal feed. If the stored material is a seed variety of crop, the above forms of contamination will destroy its seeding potential. It is also known that a seed must retain its viability if it is to be used subsequently for new crops and is also important in seed grading. Seed viability may be maintained only if the seed is permitted to respire.

A silo is generally subjected to widely varying temperature changes which substantially effect internal structure pressures. This is especially true in an air tight silo. Internal pressure is due primarily to normal daily temperature fluctuations and seasonal variations. Crops stored in silos generally continue to respire and produce appreciable quantites of various gases and, therefore, also act to effect internal silo pressure.

Under conditions causing a decrease in internal structure pressure to a point below atmospheric pressure there is a tendency for outside air to flow into the structure in order to equalize the pressure. Conversely, when conditions cause a pressure increase in the structure in excess of atmospheric pressure there is a tendency for the gases to flow out of the structure until such time as the pressure within the structure equals that of the atmosphere outside. It has been a common practice to equip silos with breather bag systems which are responsive to pressure changes within the structures. These breather bag systems in effect produce pressure responsive free breathing storage structures which can be maintained substantially air tight. Such systems, however, are expensive and require substantial amounts of storage space in the silo for efficient operation thereby reducing the effective storage capacities of the structure.

This invention provides a simple and inexpensive means to permit a storage structure to respond to pressure fluctuations thereby eliminating the possibility of structural deformation and damage of a silo which might result in the contamination of the stored material. The full storage capacity of a silo may be utilized as the invention may be disposed wholly outside the structure, and the need for expensive and bulky breather bag systems is obviated. The present invention is designed to prevent the contamination of bacteria, molds or insects of a decontaminated crop stored in a storage structure, and will also permit the free egress and ingress of filtered micro organism-free air into the storage structure thereby acting to maintain viability of stored seeds. The structure of the invention will serve to shield the filtering agent from the harmful effects of weather and will provide a means for easy replacement of the filter. The system of the invention will also be of importance where a controlled fermentation with a pure micro-organism culture is desired.

The silo or storage structure utilizing the invention is constructed to prevent micro-organism penetration. The filter of the invention consists of a suitable microorganism filtering medium loaded into a container. This container is disposed in the storage structure in a manner which will permit the filter to communicate freely with the interior and exterior of the structure. That portion of the container communicating with the structure exterior is provided with a weather shield to protect the filter from the direct effects of wind, moisture, and dust. The weather shield is constructed in a manner permitting easy replacement of the filter.

In operation, the silo is loaded with the material to be stored and treated with a sterilizing or decontaminating agent which may be one or a combination of the many well known gases, liquids or chemicals used for this purpose. Subjection of the material to be stored to radiation may also be employed. A sterilizing process must be thorough enough to destroy all micro organisms within the structure or to render them completely dormant throughout the entire storage period. Selective decontamination may be accomplished by introduction into the structure of sufficient quantities of decontaminant to destroy only undesirable micro organisms. The structure, with the exception of a micro organism filter system through which only filtered air may freely pass, is then completely sealed from the atmosphere to prevent subsequent micro organism contamination.

Internal pressure changes in the storage structure caused by atmospheric variations or the respiration of stored material will be reflected by the egress or ingress of filtered air into or out of the structure through the micro organism filtering system. This system will permit free breathing by the structure of decontaminated air. Since all undesirable micro organisms inside the filled structure have been destroyed or rendered completely inactive, filtered air will have no deleterious effect on the stored material, in fact, seed storage will be enhanced by permitting respiration and thereby retention of viability.

Other objects and advantages of the invention will appear in the course of the following description.

The drawings furnished herewith illustrate the best modes presently contemplated for carrying out the invention as hereinafter set forth.

Figure 1:
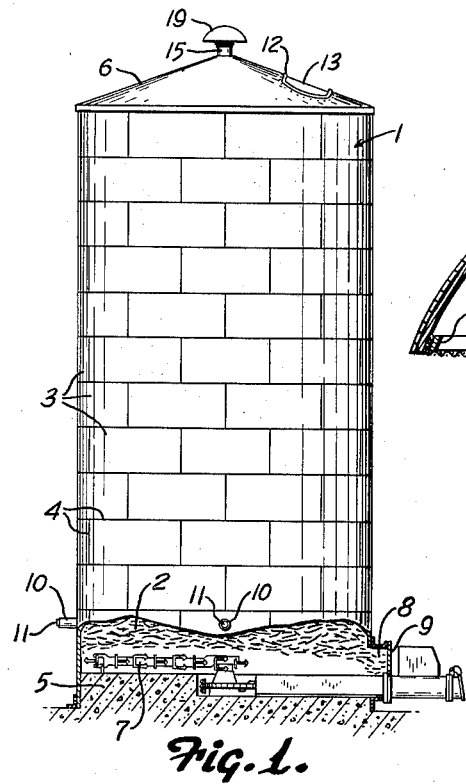
FIGURE 1 is a vertical elevation of a storage structure, with parts broken away, showing the micro organism filter breather device and the bottom unloading apparatus in operational position.

The drawings illustrate a cylindrical storage structure 1, such as a silo, adapted to contain decontaminated stored material 2 for extended periods of time. The structure comprises a plurality of generally curved plates 3 joined at joints 4. Joints 4 are provided with a sealing material which is impervious to air, moisture, and micro organisms. The plates 3 may be formed from steel and may have a coating or lining of ceramic enamel fused to both surfaces. The coating will act to protect the structure from deterioration due to weathering and corrosive influences.

The silo is supported on a micro organism impervious foundation 5 which also acts as a floor and the upper end of the silo is enclosed by a roof 6. A bottom unloading apparatus 7 similar in structure and function to that described in the Tiedemann Patent 2,635,770 is disposed in the bottom of the silo. The unloader 7 acts at the bottom of the silo to dislodge and remove the material stored therein through opening 8. Removal of stored material from the bottom of the silo causes the remainder to gravitate upon the unloader 7 thereby facilitating continuous removal. Opening 8 is sealed by door 9 which will maintain the structure impervious to micro organism penetration during the storage period.

The lower portion of storage structure 1 is provided with a plurality of filler pipes 10 opening into the silo interior and through which a suitable sterilizing or decontaminating agent may be introduced. When not in use, the filler pipes 10 are covered with a seal 11 which is impervious to air, moisture and micro organism penetration.

A loading port 12 is disposed in roof 6 of storage structure 1 to receive the material to be stored 2. Upon completion of the loading operation, closure 13 seals the loading port 12 from micro organism penetration.

Figure 2:
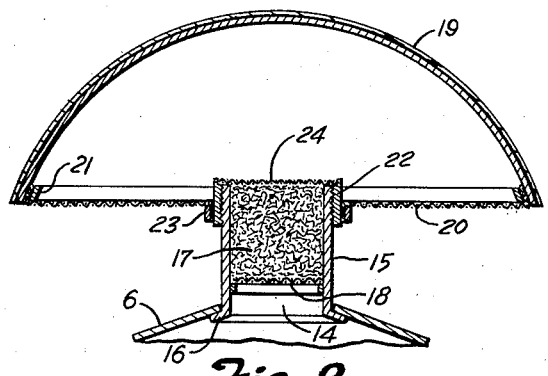
FIG. 2 is an enlarged vertical section of the upper portion of the storage structure illustrating the micro organism filter-breather device and weather shield.

As may best be seen in FIG. 2, roof 6 is provided with an opening 14 and a hollow cylindrical member or filtering medium container 15 open at both ends, adapted to communicate with the interior and exterior of storage structure 1, is secured therein. The base of member 15 is provided with an outwardly extending annular flange 16 adapted to be attached to the inside of roof 6. Attachment to the storage structure may be accomplished by either bolting or welding flange 16 to roof 6. That portion of opening 14 bordering cylinder 25 is sealed to prevent micro organism penetration.

According to the invention, cylindrical member 15 is adapted to contain a densely packed fibrous micro organism filter 17. Filter 17 is retained within member 15 by a bottom screen 18 permanently secured to member 15.

To protect filter 17 from direct exposure to the harmful effects of wind, moisture, dust, other harmful effects of weather, insects and other pests, that portion of cylindrical member 15 protruding externally of structure 1 is provided with a weather shield 19. Weather shield 19, as may best be seen in FIGURE 2, is formed of a metallic, ceramic coated, material and has a convex configuration which acts to deflect the effects of wind and moisture from filter 17. To prevent pests from contacting the filtering medium a secondary filtering medium in the form of a heavy screen 20 is disposed across the bottom of shield 19 and is connected thereto by a retaining ring 21. Screen 20 is connected to the lower end of a conduit 22 threaded into cylinder 15 by a retaining ring 23. Cylindrical member 15 is threaded to receive conduit 22 and thereby weather shield 19. The top of conduit 22 is provided with a fine mesh screen 24 serving as an additional filtering agent and a top retainer for filter 17.

Replacement of the filtering medium is simply accomplished by unscrewing conduit 22 and thereby shield 19 withdrawing the old filter, inserting the fresh filter and replacing conduit 22.

Figure 3:
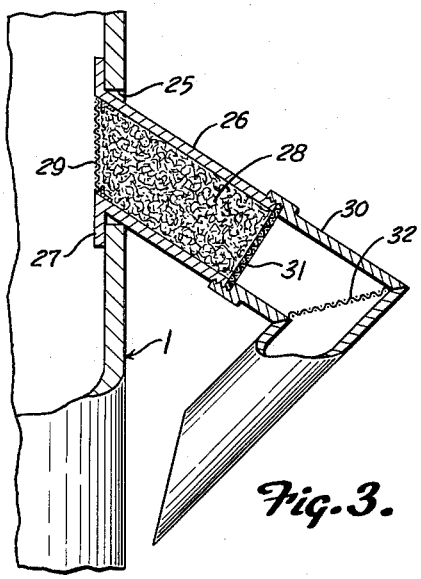
FIG. 3 is an enlarged vertical section of the lower portion of the storage structure illustrating a modified form of the invention.
Figure 5:
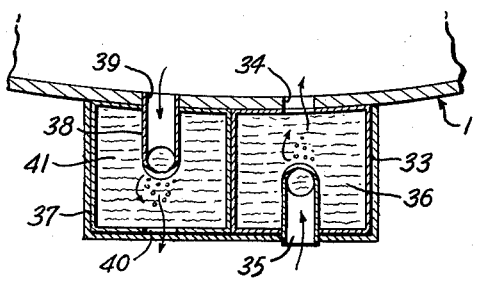
FIG. 5 is a sectional view taken along line 5—5 of FIG. 4.

FIG. 3 illustrates a modified form of the invention wherein the filter and cylindrical member are shifted to the lower portion of the storage structure. The lower portion of structure 1 has an opening 25 and a cylinder or filtering medium container 26 which is similar to cylinder 15 and is disposed in opening 25 and extends downwardly therefrom at an acute angle to the storage structure. The innermost end of cylinder 26 has an annular flange 27 conforming to the inner surface of the storage structure and is sealed thereto by a suitable micro organism impervious sealing means. A filter 28 similar to filter 17 is contained within cylinder 26. Screen 29 permanently secured in the innermost end of cylinder 26 acts to maintain the position of filter 28 in cylinder 26.

To protect the filter from the harmful effects of wind, weather, pests and the like, a conduit 30 having an elbow configuration is threaded into cylinder 26 and acts to shield filter 28. A screen 31 is permanently secured in the threaded end of conduit 30 and acts as an additional filter and a retaining means for filter 28. A screen 32 is permanently disposed across the elbow portion of conduit 30 to prevent foreign matter from becoming lodged in the elbow.

Filter 28 may be easily replaced by unscrewing conduit 30, withdrawing filter 28, replacing it, and screwing conduit 30 back in place. The configuration of conduit 30 will act to divert the direct effects of turbulence, moisture, pests and the like from filter 28 and, at the same time, promote the diversion from filter 28 of moisture accumulations in conduit 30.

Filter materials such as cellulose fibers may be employed. Wool, glass wool, and other natural and synthetic fibrous materials may be effectively used as filtering media. Porous solid filtering media, such as porcelain, may be employed but are generally less desirable as they are not capable of responding to sudden pressure changes with the rapidity characteristic of fibrous filters. A liquid medium could also be used.

While fibrous filters will function most efficiently when retained by screens, filters of the porcelain type may be retained by small protrusions in the filter container.

Figure 4:
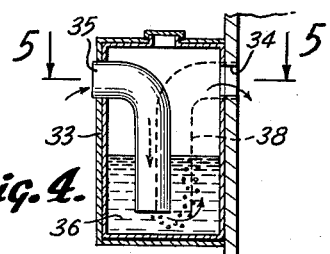
FIG. 4 is an enlarged vertical section of the lower portion of the storage structure illustrating an alternative form of the invention.

A system as shown in FIG. 4 could be employed when utilizing a liquid filtering medium. A ceramic coated container 33 is mounted in sealed relation with structure 1. An opening 34 in the wall of the structure provides free communication between the interior of container 33 and the interior of structure 1.

To permit the introduction of atmospheric air into container 33, the container 33 is provided with a conduit 35 which is in communication with the atmosphere near the top of the container and with the interior of the container near its bottom. Conduit 35 is sealed to the container so air may pass into the container through the conduit only.

Micro organism sterilent fluid 36 is disposed within the container 33, and the level of the fluid is above the lower opening of conduit 35. A reduction in pressure within the sealed storage structure, therefore, will cause a pressure imbalance within container 33 whereby atmospheric air tends to be drawn in to restore a pressure balance to the system. In the instant system air will be drawn into container 33 through conduit 35 and will pass through sterilent fluid 36 where it will be decomtaminated before entry into storage structure 1 through opening 34.

A second ceramic container 37 is disposed adjacent container 33 and structure 1 in sealed relation thereto. To permit the relief of excessive pressure accumulations within storage structure 1, a conduit 38 is provided in container 37 in communication with the interior of the structure through opening 39 and extends downwardly therefrom to a point near the bottom of container 37. An opening 40 is provided in container 37 which permits communication between the interior of the container and the atmosphere. A fluid 41 is disposed in the container and the level of the fluid is above the lower end of conduit 38 and below opening 40.

An increase in pressure within storage structure 1 exceeding the pressure outside the structure will result in a pressure imbalance. Under these conditions container 37 will act to relieve the pressure accumulation as gas will be forced through conduit 38 and fluid 41 and will finally be exhausted into the atmosphere through opening 40. In this manner the micro organism tight seal will be maintained. It is recognized that a number of other well known pressure relief devices could be substituted for the one described above and would respond satisfactorily in this system.

In operation, the storage structure is loaded with the material to be stored such as grain or silage. Upon completion of the loading operation, all openings are sealed except sterilent filler pipes 10 and the micro organism filtering apparatus. A quantity of a suitable sterilent sufficient to destroy or render completely dormant all undesirable micro organisms inside the storage structure is introduced into the structure through filler pipes 10. After decontamination, seals 11 are disposed in the filler pipes 10 completing the decontamination process and rendering micro organism free system.

The structure may respond to internal pressure variations due to atmospheric changes and respiration of the stored material by drawing in or expelling filtered air as needed to equalize internal and external pressures. Since the stored material and the interior of the storage structure have been decontaminated and only micro organism free air is allowed to pass through the filter to equalize pressures, material may be stored indefinitely without danger of spoilage or deterioration.

Removal of some of the stored material utilizing bottom unloader 7 and necessitating opening of door 9 will result in some degree of contamination. It may be necessary to introduce additional decontaminant into the structure to destroy any micro organism contamination resulting from the unloading operation. A degree of decontamination, varying with the extent of exposure to contaminate, may be necessary any time the stored material is exposed to unfiltered air.

Viability of stored seeds will be preserved by the rather rapid expulsion of the sterilent through the filter during structure breathing.

Various modes of carrying out the invention are contemplated as being within the scope of the following claims particularly pointing out and distinctly claiming the subject matter which is regarded as the invention.

I claim:

1. In a sealed storage structure having an opening, a container disposed in communication with the opening in said structure, said container communicating with the interior of said storage structure and with the exterior of the storage structure, a liquid filtering medium disposed in said container in pressure responsive relation thereto to permit the free entry of decontaminated gases into the storage structure, and means responsive to increased storage structure pressures whereby such pressures may be diminished.

2. In a sealed storage structure having an opening, a container disposed in communication with the opening in said structure, said container communicating with the interior of said storage structure and with the exterior of the storage structure, a liquid micro-organism filtering medium disposed in said container, a conduit disposed in communication with the exterior of said storage structure and said liquid micro-organism filtering medium to permit said storage structure to freely respond to pressure reductions within the storage structure and to permit the free entry of decontaminated gases into the structure through the filtering medium, and means freely responsive to increased storage structure pressures whereby such pressures may be diminished.

3. In a micro-organism sealed continuously free breathing storage structure adapted to contain decontaminated products and to maintain said products in a continuously decontaminated condition, a container disposed in an opening in said structure, said container providing continuously free gaseous communication between the interior of the structure and the exterior of the structure, a filtering medium disposed in said container to maintain stored material free from micro organism contamination and to permit the continuous free passage of gases into and out of said structure, means for retaining said filtering medium in said container, a shield disposed externally of said structure and over that portion of said container open to the exterior of said structure to protect said filtering medium from the effects of weather and pests, secondary filter means disposed between said shield and said container to form an enclosure between said shield and said container, and means maintaining the position of said shield and said secondary filter means in relation to said container.

4. In a storage structure adapted to contain decontaminated products, a container disposed in an opening in said structure, said container opening into the interior of said structure and to the exterior of said structure, a filtering medium disposed in said container to maintain stored material free from micro organism contamination and to permit the free passage of gases into and out of said structure, retaining means for retaining said filtering medium in said container, a shield disposed externally of said structure and over that portion of said container open to the exterior of said structure to protect said filtering medium from the effects of weather and pests, a conduit rotatably engaged with that portion of said container opening into the exterior of said structure to permit the rotatable removal and replacement of the conduit on the container, secondary filter means connected between said shield and said conduit and forming an enclosure between said shield and said conduit, means for removably securing said secondary filter means to said shield and said conduit thereby providing a removable weather shield to facilitate filter replacement and maintenance.

5. In a micro-organism sealed free breathing storage structure adapted to contain decontaminated products, a foundation, a hollow member mounted on said foundation impervious to micro-organism penetration, an open-ended container disposed in an opening in said hollow member and extending downwardly and outwardly therefrom, the container opening downwardly and permitting continuous free gaseous interchange between the interior and the exterior of the hollow member, a micro-organism filtering medium disposed in said container and adapted to maintain material stored in the hollow member in a condition free from micro-organism contamination while simultaneously permitting the free exchange of gases between the interior and exterior of said storage structure in response to internal pressure changes in said structure, means for retaining the filtering medium in the container, and shielding means extending generally downwardly from the container to protect the filtering medium from the direct effects of the exterior environment of the storage structure.

References Cited by the Examiner

UNITED STATES PATENTS

| | | | |
|---|---|---|---|
| 91,092 | 6/1869 | Cullmann | 99—269 X |
| 311,975 | 2/1885 | Gerber | 183—49.73 X |
| 834,937 | 11/1906 | Robinson | 183—49.73 |
| 2,305,423 | 12/1942 | Heuser | 99—235 |
| 2,522,829 | 9/1950 | Krebser | 99—269 X |
| 2,551,217 | 5/1951 | Martin | 99—271 |

FOREIGN PATENTS 825,424 12/1959 Great Britain.

WALTER A. SCHEEL, *Primary Examiner.*

GEORGE NINAS, JEROME SCHNALL, *Examiners.*

G. P. CHANDLER, CLYDE COUGHENOUR, ELI HOROWITZ, *Assistant Examiners.*